March 12, 1940.  T. B. CHACE  2,193,246
COMPOSITE METAL PRODUCT
Filed Feb. 17, 1936  5 Sheets-Sheet 2
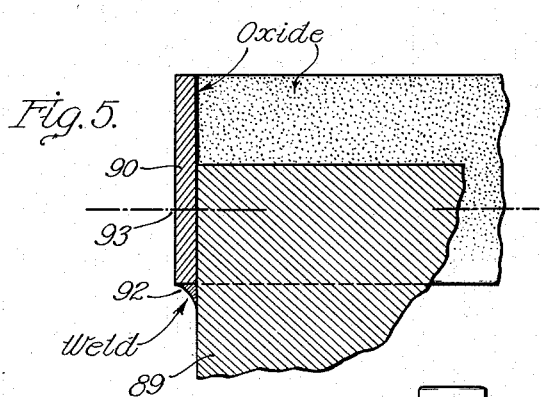
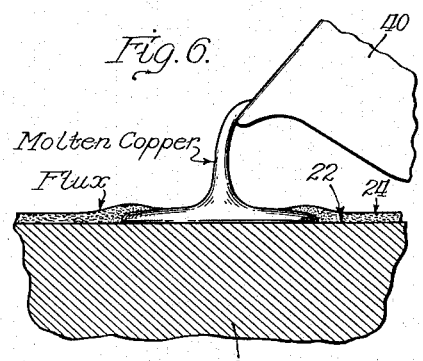
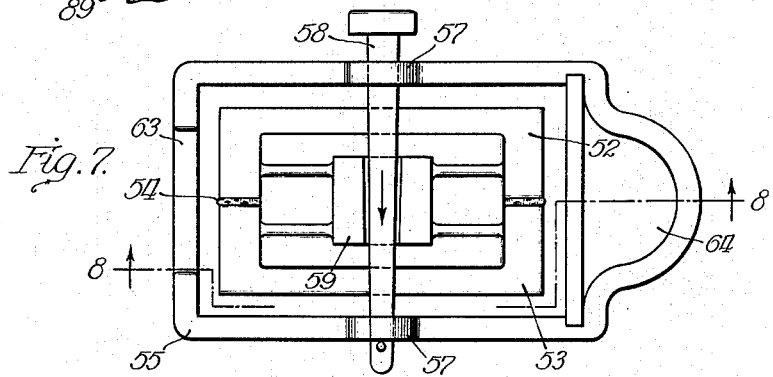
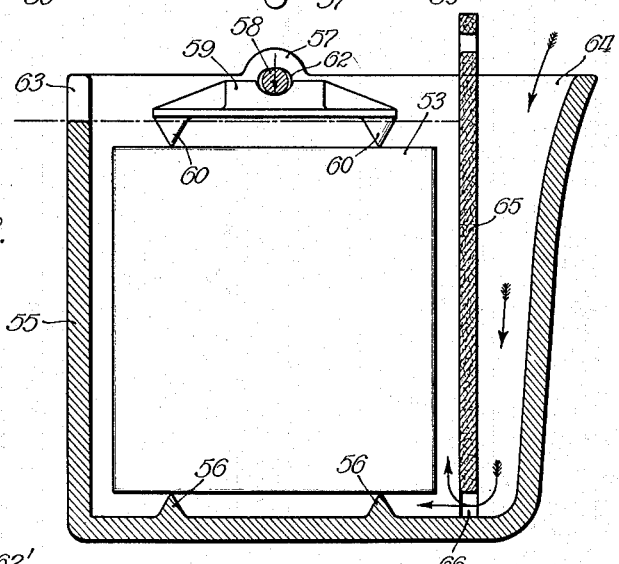
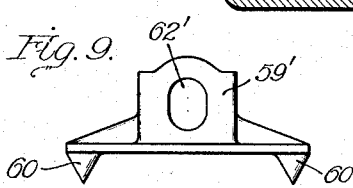
Inventor:
Thomas B. Chace
By:
Attys.

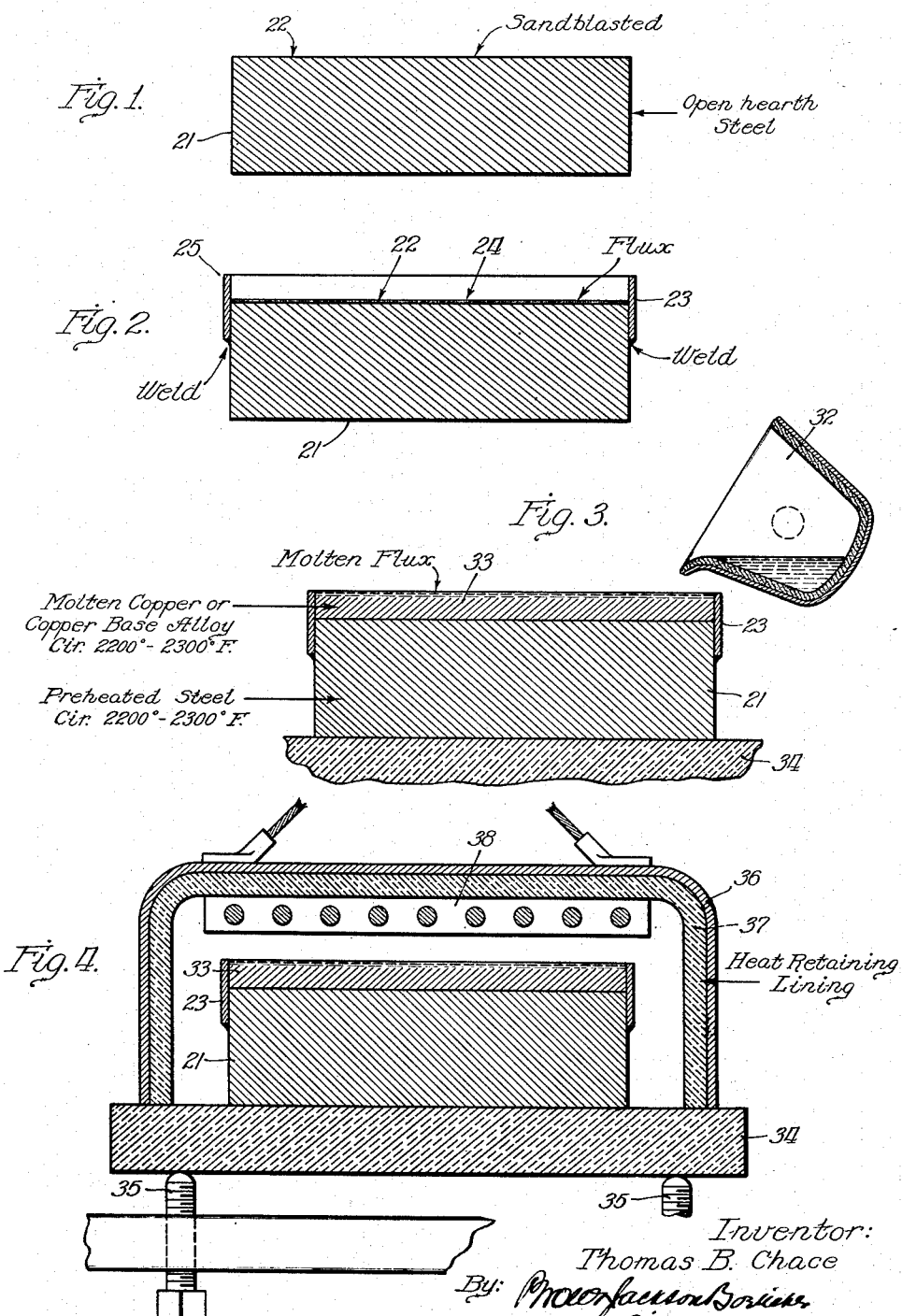

March 12, 1940.   T. B. CHACE   2,193,246
COMPOSITE METAL PRODUCT
Filed Feb. 17, 1936   5 Sheets-Sheet 3
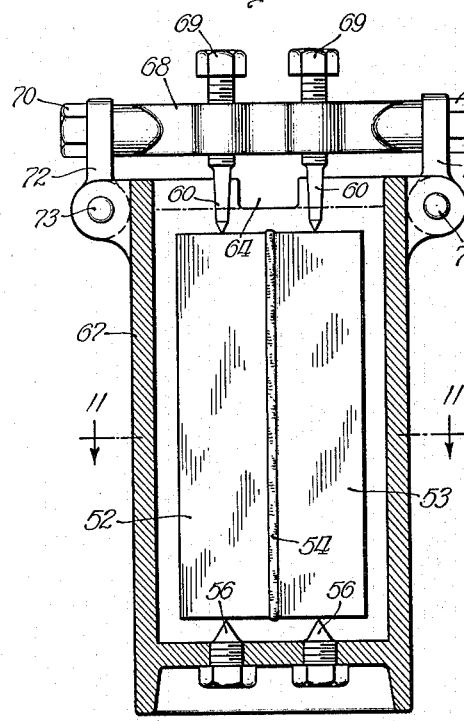
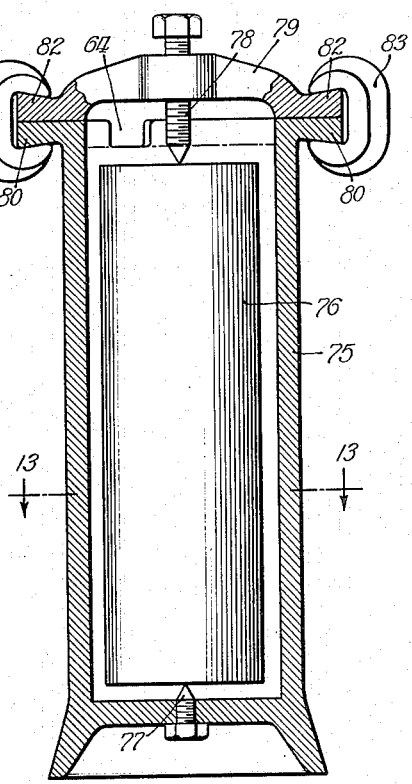
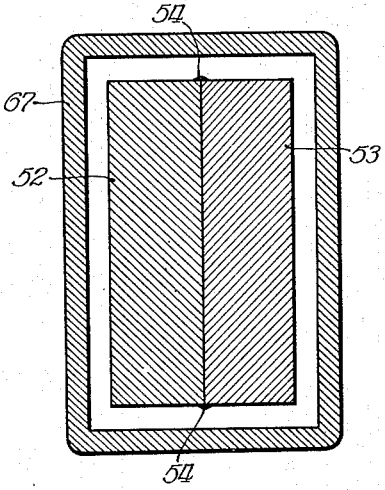
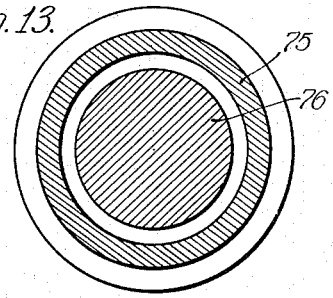
Inventor:
Thomas B. Chace
By:
Attys.

March 12, 1940. T. B. CHACE 2,193,246
COMPOSITE METAL PRODUCT
Filed Feb. 17, 1936  5 Sheets-Sheet 4
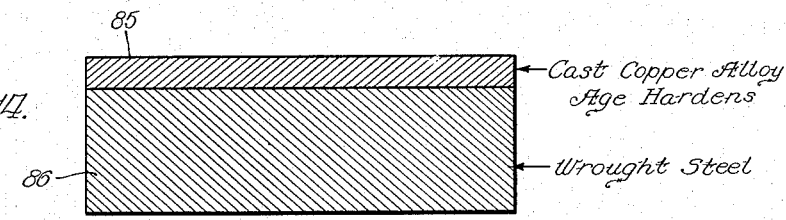
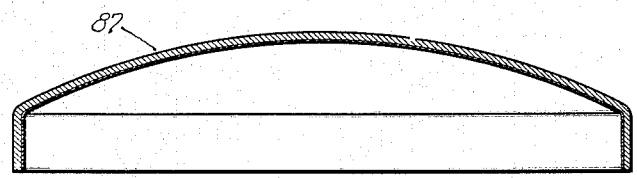
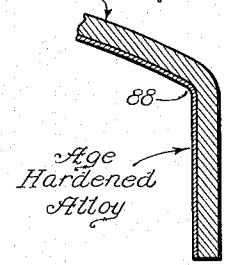
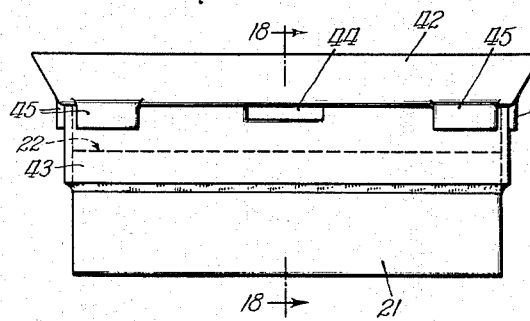
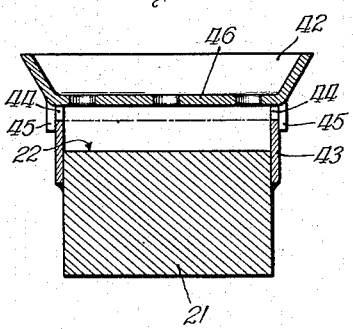
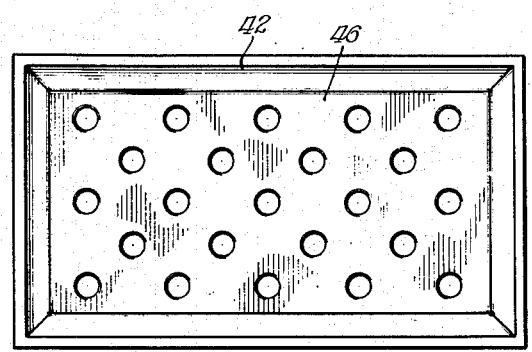
Inventor:
Thomas B. Chace
By:
Attys.

March 12, 1940.  T. B. CHACE  2,193,246
COMPOSITE METAL PRODUCT
Filed Feb. 17, 1936   5 Sheets-Sheet 5
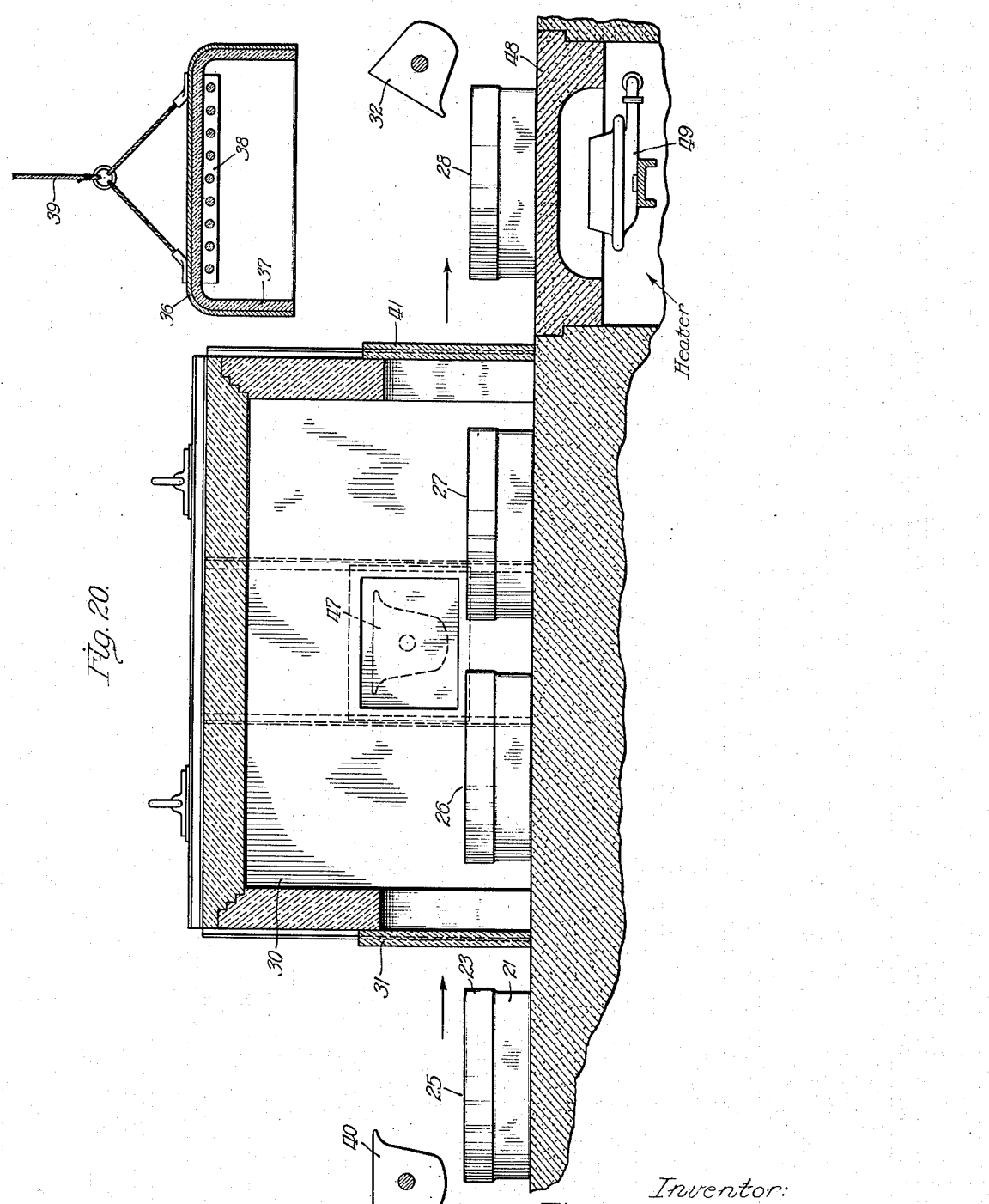
Inventor:
Thomas B. Chace
By:
Attys.

Patented Mar. 12, 1940

2,193,246

UNITED STATES PATENT OFFICE 2,193,246

COMPOSITE METAL PRODUCT

Thomas B. Chace, Winnetka, Ill., assignor, by direct and mesne assignments, to Clad Metals Industries, Inc., a corporation of Illinois Application February 17, 1936, Serial No. 64,280

4 Claims. (Cl. 29—188)

The present invention relates to the production of composite metal products.

Whereas the specific embodiment herein disclosed is the production of a composite metal product comprising one structural metal, such as steel, clad with another structural metal of corrosion resisting properties, such as copper, or an alloy thereof, this is by way of illustration, and not by way of limitation. Some of the specific features of the present invention are applicable to the production of composite metal products of special form and of specific utility, such as bimetallic thermostats or the like.

The present invention is particularly applicable to the production of composite metal products where two metals of different melting points are to be bonded together.

In my prior application, Serial No. 6,497, filed February 14, 1935, I have disclosed and claimed a process for producing a composite metal product known as copper clad steel, consisting of an inexpensive steel base to which is bonded a facing of copper or copper alloy for corrosion resisting purposes. The present application discloses certain developments of and improvements on the aforesaid process, specifically aiming to expedite and reduce the cost of the production of clad metal and to provide improved means and materials for the practice of the aforesaid process and to provide improved composite metal products.

The present invention aims further to adapt the process of producing clad metals, so far as possible, to steel mill practice.

The production of a satisfactory finished product, i. e., clad metal plates, sheets, strips, bars, rods, wire, and the like, to meet the varied requirements of corrosion resistance, structural strength, tenacity of bond, workability, finish, etc., involves reconciling many complex and conflicting requirements, factors and conditions, as I shall explain more in detail.

An object of the present invention is to provide improved forms of composite metal products, and particularly those of the type known as copper clad steel.

By way of explanation, it is to be noted that the term "copper clad steel" is employed herein as a generic term intended to include not only plain steel, preferably low carbon open hearth steel, but also high carbon steel and alloy steel, for the base, and not only copper but also suitable alloys of copper, for the face. In this connection, it is to be understood that certain of the teachings of the present invention are applicable to the general production of composite metal products consisting of metals of dissimilar melting points. Also certain of the teachings of this invention are applicable to the production of composite metal products consisting of metals of similar melting points.

A further object of the invention is the provision of a novel process for the forming or shaping of composite metal products and particularly those of the type known as copper clad steel.

A further object of the invention is the production of composite metal products and particularly those of the type known as copper clad steel having age-hardening properties.

A further object of the invention is the production of composite metal products and particularly those of the type known as copper clad steel, wherein the two metals have similar work-hardening properties.

A further object of the invention is the production of composite metal products and particularly of the type known as copper clad steel wherein the two metals have similar work-hardening properties and one or both metals have age-hardening properties.

A further object of the invention is the provision of novel copper alloys having properties making them particularly suitable for bonding to steel to produce desired composite products and particularly those of the type known as copper clad steel.

A further object of the invention is the provision of novel methods of rolling and working composite metals, and particularly those of the type known as copper clad steel.

A further object of the invention is to provide improved methods of bonding two metals of dissimilar melting points to produce composite metals and particularly those of the type known as copper clad steel.

A further object of the invention is to provide an improved mould for the bonding together of two metals to form a composite block or slab.

A further object of the invention is to provide an improved furnace and furnace equipment to facilitate bonding of two metals in the production of a composite block or slab.

A further object is to provide improved means for and methods of facilitating the bonding of two metals of dissimilar melting points.

A further object is the production of a composite metal of the type known as copper clad steel having having properties which facilitate seam welding of the same in forming articles therefrom.

A further object is to control the work-hardening properties of the facing metal and particularly the copper alloy, by regulating the absorption of ingredients from the iron or steel backing, or from an intermediate or bonding layer welded thereto.

A further object is to limit the absorption of one metal by the other, particularly the absorption of iron by the cuprous metal.

Other and further objects will be apparent from the following detailed specification and claims.

Now in order to acquaint those skilled in the art with the manner of constructing, operating and utilizing my invention I shall describe, in conjunction with the accompanying drawings, a specific embodiment of the same.

In the drawings:

Figure 1 is a cross-sectional view of a block of open-hearth steel such as is suitable to form the steel backing in forming a composite slab for the production of copper clad products;

Figure 2 is a similar view of a block provided with sideboards and having the face thereof covered with flux;

Figure 3 is a similar view of the mould constructed as shown in Figure 2 and being filled with molten copper by pouring a suitable charge of molten metal thereinto;

Figure 4 shows the mold block of steel and copper covered by an insulating hood to allow the molten metal to stand for a suitable soaking period to perfect the bond;

Figure 5 shows a detail sectional view of the side or mold boards, so arranged that they may be cut away if desired;

Figure 6 shows the action of pouring the molten copper directly onto the cold steel, floating away the flux material;

Figure 7 is a top plan view of a mold for bonding an outer layer of copper to a composite slab;

Figure 8 is a vertical section taken on the line 8—8 of Figure 7;

Figure 9 is a side elevational view of the holding block;

Figure 10 is a longitudinal vertical section through a mold for holding a composite steel ingot in place to be covered with a facing of copper;

Figure 11 is a cross sectional view taken on the line 11—11 of Figure 10;

Figure 12 is a longitudinal vertical sectional view through a mold for coating a round piece of steel stock for producing composite or clad rods, wire, and the like;

Figure 13 is a cross sectional view taken on the line 13—13 of Figure 12;

Figure 14 is a transverse sectional view of a composite slab of copper facing on a steel base;

Figure 15 is a cross sectional view of a composite metal boiler head or the like;

Figure 16 is an enlarged fragmentary view of the head shown in Figure 15;

Figure 17 is a side elevational view of a mold box and slab with a pouring fixture placed over the same;

Figure 18 is a cross sectional view taken on the line 18—18 of Figure 17;

Figure 19 is a top plan view of the pouring fixture shown in Figure 17; and

Figure 20 shows the furnace and equipment for producing composite slabs suitable for working as by rolling and forming into clad products.

For the economical production of copper clad steel, steel mill practice and equipment is desirable. This practice and equipment permits greater rolling reduction and much lower costs than corresponding operations in copper mill operations and equipment. The adoption of steel mill practice imposes certain requirements which can be met only by proper composition of the cuprous metal, a satisfactory bonding procedure, and the ability of the bond to withstand heavy punishment in the working operations.

In the production of copper clad steel, one of the critical operations is the forming of the bond between the cuprous metal and the steel. The bond may be produced in a variety of ways, that is, according to different procedures, but certain essential requirements prevail throughout to permit the working of the composite slab into the copper clad steel products by the heavy rolling with a minimum number of heats, and also for cold finishing, as may be desired.

The manner of securing or perfecting the bond may be widely varied, depending upon the particular alloy selected for the cuprous metal facing, and the treatment to which the composite slab is to be subjected during working. The specific manner of holding the cuprous metal in contact with the face of the steel slab is preferably the use of the integral mould as disclosed in my copending application. According to this procedure, a block 21 of open hearth steel, such as shown in Figure 1, has its upper surface 22 cleaned off as by sand blasting to remove oxide, scale, or the like, and to reveal the raw, clean metal. To the side margins around the face 22 there is welded a continuous retaining wall which may be in the form of a steel strip 23, projecting above the face 22 a predetermined distance, as shown in Figure 2. The lower margins of the strip 23 are welded to the side walls or flanks of the block 21 to form a tight basin the bottom of which is the upper face 22 of the steel block 21. This face 22 is the face to which the cuprous metal is to be bonded.

This bonding may be done in a variety of ways, but one suitable way is to cover the face 22 with a suitable layer of flux 24, which may be anhydrous borax or the like. The sand blasting should be performed after the mould boards 23 are in place, and immediately covered with flux or other oxygen excluding means. The mould block or slab, indicated generally by the reference numeral 25, in Figure 2, may then be disposed in a furnace 30, as shown in Figure 20, to be brought to a selected temperature usually under 2300 degrees F. The temperature of preheating is dependent upon the analysis of the alloy to be bonded to the surface of the slab, and the size of the composite slab being produced. In Figure 20, two such mould blocks 26 and 27 are shown in the furnace as being heated. The cuprous metal facing is melted either in a separate furnace or in the same furnace, and when the mould block has reached proper temperature, the molten cuprous metal, at a temperature of approximately 2200 to 2300 degrees F., depending upon the analysis of the alloy and the nature of the steel slab, is poured into the basin formed by the mould boards 23 and the top surface 22 of the block 21, as indicated in Figure 3. The flux, which is molten, is floated to the top. The cuprous metal is poured from the crucible 32 shown in Figure 3 until the basin formed on top of the block will contain no further molten metal. In other words, the mold boards 23 are of such a height that they control the depth to which the cuprous metal facing can be poured. In order to insure that the depth of the molten cuprous metal 33 will be of equal thickness over the face of the blocks 21, the table 34 upon which the block 21 is supported during the pouring operation, is suitably leveled as by means of the jackscrews 35—35 shown in Figure 4.

After the molten cuprous metal has been poured into contact with the face of the preheated block of steel 21, it is generally desirable to allow the cuprous metal to remain in molten condition upon the face of the steel for a period of time to perfect the bond by soaking. This period varies with the composition of the cuprous metal and the composition of the steel, but I have found that a period of approximately 25 minutes in the case of copper silicon alloy from the time that the copper alloy is poured, in molten condition, upon the preheated steel, until the same is solidified, is suitable and desirable to perfect the bond. I shall later explain the effect of the composition of the alloy upon the bond and the tendency of some alloys to bond more readily than others.

One manner of controlling the soaking period is illustrated in Figure 4, that is, after the pouring operation shown in Figure 3, the mold box being outside the furnace in this case, a suitable insulating envelope or cover 36 is lowered over the composite slab, the copper alloy 33 being still in molten condition. This cover 36 has a suitable heat-retaining lining 37 and in addition, contains in the top thereof an electric heater 38 which may be of the radiation or glowbar type. By means of this cover 36, with or without the heater 38, the copper alloy 33 may be maintained in molten condition the desired length of time for the soaking period to keep the copper 33 molten and to perfect the bond.

While I have above indicated the preferred practice, namely, of first forming a composite mold block, preheating the same, and simultaneously bringing the cuprous metal to molten condition, moving the block outside the furnace and pouring the molten cuprous metal into contact with the same outside the furnace, then securing the soaking period by a heat insulating cover, it is to be understood that the procedure may be varied. In fact, the cuprous metal may be poured onto the face of the steel at any stage illustrated in Figure 20, that is, with the steel cold, as shown at the left of Figure 20; with the steel preheated and in the furnace, as shown in the middle of Figure 20; or with the steel brought to a high temperature, around 2200 to 2300 degrees F., and removed from the furnace.

Also, it is to be understood that the cuprous metal may be disposed as a solid bar or plate within the mold box and brought to the molten condition within the furnace, if so desired.

Referring to Figure 20, the mold box 25 having the side boards 23 as illustrated in Figure 2 and having the face of the steel covered with a suitable flux such as borax, or boric acid, or other suitable flux, may have the cuprous metal poured as from the crucible 40, shown at the left of Figure 20, directly upon the cold face of the steel to fill the mold box. The tendency for the molten copper, as shown in Figure 6, to bond to the surface by melting the flux and flowing under the same, is illustrated in this figure. Preferably, the cuprous metal is heated to a high temperature and poured onto the face of the steel block in such a manner as to secure rapid distribution over the surface of the block 21 where the cuprous metal is poured on cold.

I find that it is not even necessary to cover the face of the block with flux where either a non-oxidizing atmosphere is employed, or where the cuprous metal in molten form is brought quickly over the entire surface of the steel block, so that no exposed part is heated to a temperature where it will oxidize before it is covered with cuprous metal. That is to say, for cold pouring of the cuprous metal onto the face of the steel base, either air is excluded by a suitable flux which is flowed off of the surface by the molden cuprous metal, or the oxygen of the atmosphere is excluded by providing a non-oxidizing or reducing atmosphere, or the cuprous metal is rapidly spread over the surface of the steel to prevent raising the temperature of the steel to oxidizing value in advance of being covered with the cuprous metal. To perform this latter operation I may employ a trough-like ladle or pouring container holding a predetermined amount of molten cuprous metal. This is lowered close to the surface of the steel and opened quickly so that the molten cuprous metal spreads over the entire surface of the steel almost instantaneously.

In Figures 17, 18 and 19 I have illustrated a pouring fitting 42 which consists of an open topped basin of approximately the outline of the basin formed by the integral slab and mold. In this case the side boards 43 are provided at one or more places with a weir or slot 44 of a predetermined height above the face of the block 21 to determine the level to which the cuprous metal may be poured in contact with the face of the steel. The basin-shaped fitting 42 has a bottom wall 46 provided with holes suitable distributed so that upon pouring the cuprous metal into this basin the cuprous metal will be distributed in a number of streams more or less evenly over the surface of the face 22 of the block 21. The fitting 42 has depending ears 45 for registering it over the side boards 43 of the composite mold and block. In order to avoid the loss of temperature the fitting 42 may be heated independently of the block 21 or, where this fitting is to be employed in conjunction with the preheated mold block, it may attain the same temperature as the mold block.

Referring again to Figure 20, the mold block may be preheated to a desired degree, depending upon the resultant temperature to be produced by the molten charge poured upon the surface of the same. That is to say, assume that a high temperature alloy, such as Monel metal, or a high melting point metal, such as nickel, were to be bonded to the surface of the steel block 21 within the mold 23, the block with the integral mold may be maintained quite cold or heated up partially, so that when the high melting point alloy or metal were poured upon the face of the same, excessive absorption or intermingling of the metals each with the other would not result. This process may be applied to the cladding of steel with stainless steel, if desired. A pouring fitting such as shown in Figures 17 to 19 may, in such case, be employed, the same to be made of a suitable material of higher melting temperature, either a metal or a refractory, as deemed desirable.

Thus, if the mold box is to be cold when the facing metal is poured into the mold box, the operation would be as illustrated at the left of Figure 20, outside the furnace. If the molten metal is to be poured into contact with the face of the mold box when the mold box has been heated to a desired temperature, the pouring may be done inside the furnace, as shown at the central part of Figure 20, at the blocks or mold boxes 26 and 27, and the ladle 47. There is the disadvantage that it is difficult to move the mold block with the molten metal poured into the top of the same, after the pouring operation, without losing some of the metal by slopping or splashing over the edges. This may be controlled by making the sides of the mold box higher at all points than the desired thickness of the cuprous metal facing and cutting a weir or escape opening at a predetermined level. In the event that such a weir or hole in the side walls of the side boards is employed, the same may be plugged up by a plug of metal or refractory material if it is desired to move the mold and block with molten metal in the mold portion.

Where the normal procedure first above described, of introducing the mold block cold into the furnace 30 and then bringing it to a suitable preheat is employed, the block is moved outside the furnace, as illustrated at 28 in Figure 20. Here it may be put on a suitable leveling table or upon a heated table 48, heated by a burner 49 or an electric heater (not shown). The molten metal is then poured into the same from the crucible 32 and the cover 36 is disposed over the mold and block for the desired soaking period, as explained in connection with Figure 4.

As an alternative method, the combined mold and slab as shown at 25 in Figure 20 may, while relatively cold, be charged with molten alloy from crucible 40. Then the composite slab with the cuprous metal solidified thereon is charged through door 31 into the furnace 30 until it is brought to approximately 2200° to 2300° F., and then the slab is moved out the door 41 onto the carborundum soaking table 48. The cover 36 is then placed over the slab and it is allowed to remain for a soaking period with the cuprous metal or other facing metal in molten condition.

While it is the preferable practice to employ fluxing material for preserving the face of the steel block from oxidation by the atmosphere if the atmosphere in the furnace 30 is maintained neutral or reducive in character, the flux need not be employed, and molten metal from the crucible may be poured into contact with the face of the steel without employment of a fluxing material.

The fluxing material, where employed, may include a metal for producing a better bond at the junction, as explained in my earlier copending application above referred to. In such event, nickel is the preferred material to be employed within the fluxing material, powdered nickel being preferable.

If the molten metal is poured upon the slab cold, then it is generally necessary to put the slab into the furnace and bring the slab up to the temperature of maintaining the molten metal in contact with the face of the slab for a predetermined period of time for the soaking period to perfect the bond. When the bond is subject to less working, or requires no great tenacity, the cuprous metal may be poured onto the slab either cold or partially preheated or completely preheated, and the soaking dispensed with.

Likewise, where the steel is partly preheated and the molten metal poured in contact with the surface of the same, it is desirable to maintain the molten metal for a time in contact with the base to perfect the bond, although with the higher melting point metals and alloys the period may be considerably shortened or substantially eliminated.

Where it is desired to make a double ingot, that is, two steel blocks back-to-back, surrounded completely with cuprous metal or a like facing material, or even a facing material of stainless steel, the two blocks such as 52 and 53 are first welded together at their meeting margins, as indicated at 54 in Figure 7, as by a torch weld. These two blocks now constitute a single body, and are disposed within a mold box 55 and caused to seat upon conical projections 56 in the bottom of the mold box. Obviously, these projections 56 may be separately manufactured, or formed as integral parts of the mold box 55. Preferably three or four such projections 56 are formed in the bottom of the mold to give stable support to the compound block. The mold is provided with a pair of ears 57—57 which register with each other and which are adapted to receive a drift pin 58 of tapered form. This tapered pin 58 bears against a contact piece 59 having similar conical parts 60—60, three or four in number in order to give stable contact with the composite block. The contact block 59 may be formed as shown at 59' in Figure 9. Thus, instead of having merely a groove 62 across the top, as indicated in Figures 7 and 8, an eye 62' may be formed instead and the metal surrounding the eye provided with a suitable shoulder for assisting in releasing the block from the mold when it is desired to extract the casting.

The mold 55 has a gate or weir at 63 for controlling the depth to which the molten metal such as cuprous metal or other molten metal, may be poured into the mold box. The mold is provided with a pouring throat 64 by which the metal may be introduced into the bottom of the mold box and caused to rise about the side walls of the composite block 52—53. The manner in which this is effected is apparent from Figures 7 and 8, in that an intermediate wall or partition 65, preferably guided in the groove at each side margin, permits the metal which is poured through the throat 64 to descend to the bottom of the mold box, pass under the edge of the wall or partition 65, and thus gradually rise about the composite block to the level controlled by the gate or weir 63.

After the pouring is completed, that is, the level of the metal brought up to the overrun level, the wall 65 may be thrust downwardly substantially to close off the connection between the metal in contact with the composite block 52—53 and the metal in the pouring throat 64.

The shape of the mold box and of the throat is preferably such that upon solidification the casting will clear itself readily from the mold box and may be dumped out of the same.

The advantage of pouring the metal from the bottom is particularly evident where the surfaces of the block are protected by a coating of flux, such as borax, glass, or the like. Where the metal is poured in from the top the tendency is to melt away the flux and expose the surface of the metal too readily, whereas, if the metal is flowed in from the bottom the flux is floated upwardly and continues to protect the surfaces which are not yet covered with the molten metal.

Obviously, if desired, a continued soaking period may be employed with the metal retained in the mold box, inasmuch as the steel block 52—53 cannot float out of place or become dislocated.

When the casting is removed from the mold box, the sprue which is contained within the throat 64 is readily separable, either because of the lowering of the partition 65, where that is done, or by the small section at the point 66, where the sprue and the casting are joined.

The partition 65 may be made of a refractory, destructible in each use, or it may be of a fibrous refractory which may be used a number of times, or it may be made of metal, likewise usable as a gate or valve for repetitions of the casting operation.

Obviously, the manner of holding the steel block in place may be varied. Thus, in Figure 10 I have shown a mold box 67 for holding a composite block 52—53 of substantially the same character as illustrated in Figures 7 and 8. In this case the points 56 are manufactured as separated pieces and inserted in openings in the bottom of the mold box 67. The top fitting in this case comprises a cross bar 68 having screws 69—69, with points corresponding to the points 60—60 for holding the composite block 52—53.

The yoke 68 is connected by releasable screws 70—70 to hinged arms 72—72. These arms are hinged on the pins 73—73 to lugs formed integral with the side walls of the container 67. The mold is provided with the weir or overflow gate 64 for regulating the height of the molten metal above the body of the blocks 52—53. The metal may be introduced either by pouring the same into the top in contact with the blocks 52—53 or a pouring throat and partition 65 may be employed, as shown in Figures 7 and 8. In either event the block 52—53 is coated on all sides with the molten coating metal and after the composite block is removed from the mold it is subjected to working as by rolling to the desired degree and then the edges are sheared apart to remove any joint which may exist between the two coated sheets. While I have shown the block 52—53 as coated substantially equally on all sides, it is to be understood that these proportions may be varied without departing from my invention.

In Figures 12 and 13 there is shown a circular mold 75 adapted to receive a round billet or bar 76 resting at its lower end upon the conical screw point 77 and held likewise by a pointed screw 78 at the top. Obviously, any number of such points which are desired may be employed, but if the steel billet or bar 76 is provided with a conical or cylindrical recess the block may be readily centered with respect to the mold.

The screw 78 may be mounted in a yoke 79, this yoke and the mold 75 having matching ears 80 and 82 held by suitable wedge clamps 83. In the forms of mold shown in Figures 7 to 13, inclusive, the soaking period, for securing bonding, may be provided by putting the mold with the casting therein into a furnace and bringing the entire mold and casting to the temperature which will maintain the alloy molten in contact with the central block or core. Alternatively, the central block or core may be held cold in the mold and provided with the cast envelope of molten metal introduced into the mold by pouring. The composite block then is removed from the casting mold and may be deposited in another mold for the soaking to perfect the bond.

In considering the working of the composite plates or blocks into sheets, strips, or the like, it appears that under the action of rolling the area of the bond between the copper and the steel is extended. I conceive that the composite block consists of laminae. Within the cuprous metal the laminae may be considered as substantially uniform cuprous metal until they approach the region of the bond. Likewise the steel may be considered as consisting of laminae uniform in their composition and characteristics until they approach the region of the bond. The laminae may be considered as individual plates merely lying on top of each other. The rolling process, or other processes of working, tend to thin out and extend the area of the laminae individually. In the region of the bond between the cuprous metal and the steel it appears that from the cuprous metal side the laminae of infinitesimal thickness progressively, as they approach the bond, consist of increasingly more steel and less cuprous metal. Similarly the laminae, progressively considered from the steel side towards the bond, consist of more cuprous metal and less steel until at the bond the single lamina, which may be of the same mathematically considered infinitesimal thickness, consists of a certain definite ratio of cuprous metal and of steel which may be considered of equal parts of cuprous metal and of steel. I do not mean to say that exactly at the meeting point the imaginary lamina contains equal parts of cuprous metal and steel, but present the picture for the purpose of teaching the tendency of the present invention.

Under working, as by rolling, each lamina, including those which are progressing from cuprous metal into steel or vice versa, must equally be reduced in thickness, and the key to the successful practice of my invention is, first, that there must be sufficient depth of bond that when working is completed the bond is still mechanically adequate, and second, that the character of the metal of the bond be sufficiently ductile and malleable to permit of its extension in area and reduction in thickness without injurious embrittlement or other objectionable characteristics.

In order to promote the depth of bond and to control the character of metal in the lamina at the bond, I employ various expedients. One expedient is that of employing sand blasting to clean the surface. Sand blasting gives a clean metal surface and at the same time provides a definitely rough surface, that is, a surface that may be said to have depth. The depth of the surface may be controlled by the character of the sand blasting, that is, the size of grains employed and the velocity of impingement. This has largely to do with the mechanics of securing a depth of surface. Other methods of increasing the depth of surface and thereby the depth of bond may be employed, such, for example, as impacting the surface with a roughening tool or the like.

To control the character of the metal of the bond as distinguished from the composition of the cuprous metal throughout presents a difficult problem, particularly in that the cuprous metal tends to absorb iron from the steel during the soaking period. Also, where the cuprous metal and steel are brought together at a high temperature, that is, where the steel is preheated to a relatively high temperature, pouring the cuprous metal in contact therewith tends to produce an absorption of steel throughout the cuprous metal facing, which produces a composition which may contain more iron than is desired through the main body of cuprous metal, though the composition might not be objectionable at the bond. In brief, the iron may migrate too far from the bond. The migration or diffusion of iron into the cuprous metal is determined largely by the time and temperature of the soaking period. The rate of migration under a given soaking temperature is not constant, but decreases somewhat as a logarithmic function. For example, when the temperature of the molten cuprous metal is maintained at or above the pouring temperature, the rate of migration decreases decidedly after the first three to five minutes, and is very slow later, for instance, after twenty minutes.

I have observed that if no attempt is made to maintain the melting temperature after pouring molten cuprous metal onto the preheated base, the rapidly solidifying cuprous metal confines iron migration to the bonding section. Thereby the outer part of the body of cuprous metal is free from iron contamination, and when the slab has been rolled to thinner section, the outer surface will still be free of iron contamination.

On very large slabs, the retained heat may be so considerable that even though the poured slab be allowed to cool as rapidly as it will, the melted metal will be retained in molten condition, and soaking will continue beyond that necessary only for bonding, and thereby permit excessive iron migration.

The time and temperature of the soaking perior required is dependent upon the metal or alloy being bonded. Pure copper or copper nickel alloys for instance bond readily to steel by my process, and require only a normal cooling time after pouring for soaking to perfect the bond. The poured alloy must, however, be kept molten long enough for the flux to work to the surface. This is usually a matter of less than a minute.

Silicon copper alloys are much more difficult to bond to steel and require a longer soaking period during which the silicon copper alloy is maintained in the molten state.

By certain variations in the practice of my process, the iron migration may be controlled. Thus in the case of alloys which bond readily and require only normal cooling from the molten state for soaking, but when the slabs manufactured are so large as to prolong the soaking period beyond what is required for bonding, and thereby permit undesired iron migration, the pouring may be done in two or more stages. In carrying out this practice, it is usually desirable to make the first pouring when both the steel and the copper alloy are at maximum predetermined temperatures to assure quick and adequate bonding. This first layer may be allowed to solidify, being kept covered with flux to exclude air from the surface.

The second pouring may then be at lower temperature as the two copper or alloy layers will bond readily if the surface of the first layer is kept from oxidizing. The second layer or pouring needs be kept molten only long enough to float the flux to the surface. After the first layer is in place, subsequent pourings do not penetrate to the steel base, and hence excessive iron migration does not occur, and very little if any contamination at the outer surface occurs.

Where the composite slab involves a high silicon-copper alloy, which I have found is not practicable to bond directly to the steel base, for rolling, an intermediate bonding alloy lower in silicon is preferably employed. Copper or a copper nickel alloy may be employed for the bonding alloy. A layer of this bonding metal or alloy is first poured and bonded to the steel base by proper soaking. This intermediate layer will bond more readily to the steel base than will the higher silicon copper, and also it bonds readily to the silicon copper. Thus, when the high silicon copper is poured to make up the main body of the facing, it will bond very readily to the intermediate bonding alloy.

I have found that work hardening properties in the intermediate bonding alloy are not as important as in the main body of the facing alloys. However, I prefer to have the intermediate bonding alloy of work hardening properties similar to those of the steel base and the outer cast copper alloy. The intermediate bonding alloy is increased in structural strength by excessive iron pick-up during the soaking period of the first pouring. Also the cuprous metal of the first pouring may contain small amounts of silicon and nickel, or may be substantially a high nickel-copper alloy.

Instead of an initial pouring, the bonding material in the form of a thin slab or a layer of powder or the like may be melted upon the fluxed surface of the steel base.

Slabs thus coated or bonded by a first pouring of bonding alloy to the top face may be employed back to back, as shown in Figures 7 to 11, and held in the mould for receiving a pouring in the mould as shown in said Figures 7 to 11. Alternatively, the steel block or blocks, as shown in Figures 11 to 13, may receive a bonding layer in the mould shown in Figures 11 to 13, and then when solidified be placed in larger moulds and have the outer layer applied thereto by pouring.

I aim to employ an analysis of the alloy which will be bonded to the steel according to my process and stand hot or cold rolling without affecting the bond, and which will have similar work-hardening properties and yet be ductile enough for ordinary forming and have a similar coefficient of expansion to that of the steel.

There are many problems of working composite slabs of cuprous metal facing and steel base, or two metals which, as solid metals, are worked by quite different methods of handling and differences in detail. Hence the importance of having, in combination, a steel and a copper alloy which work as nearly alike as possible, can be readily understood where it is desired to follow steel mill practice. The steel mill practice is desirable, first, because of the lower cost of working into plates, sheets, or strips, and, second, because the composite work piece is mainly steel and the problem of working it is, in reality, the problem of steel working complicated by the corrosion resisting facing and the bond between the two.

Steel can be hot rolled at temperatures around 2200° F., hence, a copper alloy permitting a relatively high rolling temperature is desirable. Also, the cuprous metal should permit a wide range of rolling temperatures, so that excessive re-heating is eliminated and maximum reduction may be accomplished per heat. The alloy created at the union of the cuprous metal and the steel during bonding should be such that it does not necessitate critical temperatures or practice in rolling and annealing.

The cuprous metal and steel should have similar work-hardening properties, so that they roll out evenly. If the steel work-hardens faster than the cuprous metal, the cuprous metal rolls out appreciably over the ends and edges of the steel, causing loss of the high-cost metal and making it difficult to maintain correct proportional thickness. The two metals should have similar structural strength, similar coefficients of expansion, and yet the cuprous metal may have a melting point sufficiently below that of steel, so that it can be maintained in molten state on the steel without excessive iron absorption.

I have found that some copper alloys have one or more outstanding properties for copper clad steel, but are lacking in others to make satisfactory processing and to constitute a usable product. For instance, pure copper bonds readily to steel by my process, but pure copper is very soft, particularly in cast form, as compared to wrought steel base, and does not roll evenly with the steel. Also pure copper has a high heat conductivity, and for this reason it is difficult to seam weld the composite plate into tanks and the like. This is true even though the copper is backed by the lower heat conductivity steel. Nevertheless, pure copper clad steel is required for certain limited clad applications.

Copper-nickel alloys are more desirable, in fact, they bond readily to steel, and are more refractory and roll more like steel, and have lower heat conductivity for easier seam welding. However, substantial amounts of nickel alloyed with copper are required for these properties, and as nickel is a high cost metal, the cost of the metal is increased appreciably over pure copper. For some special corrosion resistance applications copper-nickel alloy clad steels are required.

Silicon has great utility with copper for copper-steel clad products, and only comparatively small amounts are needed to increase structural strength, and produce properties so that the alloy rolls similarly to steel. Under three per cent silicon in copper reduces the heat conductivity to about 30 per cent of that of pure copper, so that it seam welds in a very satisfactory manner. Silicon is low in cost and does not increase the cost of the alloy to any extent over the cost of pure copper and silicon-copper alloys have a broader field of application for corrosion resistance than even pure copper itself. Small additions of other elements such as iron and nickel better these properties.

A copper alloy having approximately 3% silicon, 96% copper and 1% manganese, has very good corrosion resistance, similar ductility and strength, and work-hardens much like steel in rolling, and seam-welds satisfactorily. However, the comparatively high silicon content makes the copper alloy very difficult to weld to steel, and although I have successfully welded this combination, creating a very high strength bond, I find that the alloy created at the union is quite sensitive to hot rolling and annealing temperatures. Several roll passes at temperatures under a dark red heat seem to break up the alloy at the union, and the two metals can be easily separated. If rolling temperatures are kept above 1000° F., the bond is not affected and cannot be separated. This limits the processing, and also the product to a hot rolled finished material. Now, if 1% to 5% nickel is added to the 3% silicon copper alloy, or if powdered nickel to the extent of 1% to 5% of the copper is used as a flux, the alloy created at the union is not subject to a critical temperature range in rolling. This copper alloy, however, of approximately 3% silicon with 1% to 5% nickel, is very hard and too refractory for forming. By reducing the silicon content to about 1½% the alloy created at the union is not affected by hot or cold rolling, but the copper alloy is so soft and has such dissimilar work-hardening properties that it rolls out excessively over the ends and edges of the steel. However, by adding 1 to 5% nickel (preferably 1½%) to the 1½% silicon copper alloy, nickel silicides are formed, which make the copper alloy refractory enough so that it rolls out evenly with the steel, and is ductile enough for such forming as into double dished heads. The weld in this combination is not disturbed by rolling or annealing temperatures, except for long periods of soaking, such as for several hours, in the range of 1280° F. to 1400° F., which is easily avoidable.

Through this temperature range, there is apparently extensive diffusion, or a precipitation out of some of the elements, creating a structure at the bond which can be separated, whereas, if temperatures under this range are used, the excessive diffusion apparently does not take place, and if temperatures over this range are used, the structure apparently re-dissolves so that the bond cannot be separated. This critical temperature range varies with the analysis of the two metals to be bonded, or the alloy created at the bond, and is particularly sensitive to silicon content. The above example of 1½% nickel to 1½% silicon copper alloy is one example of a very satisfactory copper alloy clad steel, both as to the product and as to the manufacture of the same. I find that iron, aluminum, manganese or nickel and copper make satisfactory copper alloy clad steel.

I have investigated the possibilities of various alloys, and the following table is a representative list of copper alloys having suitable properties for producing copper alloy clad steel.

Table No. 1

| Alloy No. | Ni | Zn | Si | Fe | Mn | Sn | Al | Cu |
|---|---|---|---|---|---|---|---|---|
| | Per cent | Per cent | Per cent | Per cent | Per cent | Per cent | Per cent | Per cent |
| 1 | 1 to 5 | 0 | 1 to 3 | .2 to 4 | .2 to 1 | 0 | 0 | Remainder. |
| 2 | 1 to 5 | 1 to 2 | 1 to 3 | .2 to 4 | 0 | .5 to 1 | 0 | Do. |
| 3 | 1 to 5 | 0 | 1 to 3 | 0 | 0 | .5 to 3 | 0 | Do. |
| 4 | 5 to 35 | 2 to 35 | 0 | .2 to 4 | 0 | 0 | 0 | Do. |
| 5 | 5 to 35 | 2 to 35 | 0 | 0 | 0 | 0 | 0 | Do. |
| 6 | 2 to 70 | 0 | .2 to .5 | .2 to .4 | .25 to 2 | 0 | 0 | Do. |
| 7 | 2 to 70 | 0 | 0 | 0 | 0 | 0 | 0 | Do. |
| 8 | 1 to 5 | 0 | .2 to 1 | .2 to 5 | 1 to 10 | 0 | 4 to 10 | Do. |
| 9 | 1 to 5 | 0 | .2 to 1 | 0 | 0 | 0 | 1 to 5 | Do. |

Items numbered 1, 2 and 3 in the above list are strengthened coppers, all containing approximately the same percentage of nickel and silicon. A part of the iron may be that which is absorbed from the steel mold. The manganese appears to have a ductility imparting property and has some effect upon the grain structure which is desirable. The zinc and tin constitute also ingredients for improving the workability or ductility of the alloy.

Items Nos. 4 to 7, inclusive, constitute refractory copper alloys which are high in nickel content.

Items Nos. 6 and 7 are recognizable as allied to the Monel metal. Items Nos. 8 and 9 are known as aluminum bronzes. Monel metal of an analysis of 65.7 nickel and 26.3 copper has a melting point of the order of 2370° to 2460° F. It is suitable for cladding. The Monel metal may contain up to 3% iron, 1½% manganese, .25% silicon, and .25% carbon.

In certain products where copper clad steel is desirable, for example, tanks and the like for containing liquids, the decrease in strength of the finished sheet over that of solid steel may require a change in dimensions which would constitute a departure from standard dimensions heretofore established. The decrease in strength occasioned by 10% to 20% of the thickness of the finished article constituting cuprous metal instead of steel, is generally not serious, but it is possible to increase the strength of the cuprous metal by imparting to it age-hardening properties. Age-hardening ability appears to depend upon the presence of an ingredient or ingredients the solubility of which in the copper alloy is greater at high temperatures than at low temperatures. Age-hardening, or precipitation hardening as it is sometimes designated, is a property of alloys of the solid solution type which contain a hardening constituent the solubility of which in the alloy at high temperatures is greater than at low temperatures. The alloy comprising the solid solution, when quenched from above the solid solubility temperature, is supersaturated and unstable, and on reheating to a temperature below the solid solubility temperature, the unstable solution tends to revert to an equilibrium condition which corresponds with a tempering effect. The increase in hardness secured thereby is a supersaturated solid solution hardening.

The equilibrium diagram of a copper-iron solution or alloy shows a change with temperature in the solubility of iron in copper from approximately 4% at 2000° F. to approximately .5% at 1000° F. Therefore, iron which is easily secured in the practice of my process as a hardening constituent, is particularly desirable, as drastic quenching is not necessary to bring about supersaturation at low temperatures. A high degree of hardening can be produced by cooling slowly and reheating to a temperature under the quenching temperature. The solubility of silicon in copper varies from 6.7% at 1350° F. to about 4% at 750° F., but a copper alloy containing over 3% silicon is very refractory and difficult to bond and to roll. Hence the silicon alone as a hardening constituent is undesirable, and likewise it is undesirable in excessive amount because of difficulty in bonding. However, silicon with suitable amounts of nickel, iron, chromium or cobalt forming the corresponding silicides, are suitable for my purposes. Nickel silicide is soluble in copper to the extent of 8.2% at 1830° F., and only .7% at 570° F. Cobalt silicide is soluble in copper to the extent of 3.2% at 1830° F., and .3% at 570° F. The nickel-iron-silicon-copper alloy shown as item No. 1 in Table No. 2 below, is suitable for forming clad metal of the copper clad steel type for my purposes.

The appended Table No. 2 recites the composition of alloys suitable both for bonding and working to a finished product and thereafter capable of age-hardening.

Table No. 2

| No. | Si | Ni | Mn | Fe | Co | Al | Sn | Cr | Zn | Be | Cu |
|---|---|---|---|---|---|---|---|---|---|---|---|
| | Per cent | Per cent | Per cent | Per cent | Per cent | Per cent | Per cent | Per cent | Per cent | Per cent | Per cent |
| 1 | .5 to 3 | .5 to 5 | .25 to 1 | .1 to 5 | | | | | | | Remainder. |
| 2 | .5 to 1 | | | | .5 to 3.5 | | | | | | Do. |
| 3 | | | .5 to 15 | | | 5 to 10 | | | | | Do. |
| 4 | | | | | .5 to 3.5 | 5 to 10 | | | | | Do. |
| 5 | 1 to 3 | 5 to 40 | | | | | 5 to 10 | | | | Do. |
| 6 | .5 to 3 | .25 to 5 | | | | | | | | | Do. |
| 7 | .5 to 3 | | | .1 to 5 | | | | | | | Do. |
| 8 | .5 to 3 | | | | .25 to .35 | | | | | | Do. |
| 9 | .5 to 3 | | | | | | | .1 to 5 | | | Do. |
| 10 | 1 to 3 | | 2 to 12 | | | | | | | | Do. |
| 11 | 1 to 3 | 1 to 5 | | | | | | | 5 to 35 | | Do. |
| 12 | .5 to 3 | 10 to 40 | | | | | | | | | Do. |
| 13 | | .5 to 2 | | | | 1 to 32 | | | | .25 to 2.5 | Do. |
| 14 | | .5 to 5 | | | | | | | | .25 to 2.5 | Do. |
| 15 | .5 to 1.5 | .5 to 5 | | .1 to 5 | | .5 to 5 | | | | | Do. |
| 16 | .3 to 5 | 2 to 30 | | | | .5 to 8 | | | | | Do. |

Thus, by forming a composite block as shown in Figure 14, wherein the facing 85 is a cast copper alloy having age-hardening properties, and the backing 86 is made of open hearth low carbon steel of wrought characteristics, by working plates of copper clad steel may be produced suitable for forming into finished articles such as the head 87 shown in Figure 15.

If it be attempted to make the layer of cuprous metal too refractory, that is, of such strength as to be comparable to the strength of steel in the finished article, it will be difficult to form or even to roll without injurious effect upon the bond. In forming a shape such as shown in Figure 15, the relatively sharp bend 88 indicated on the enlarged fragmentary view of Figure 16, might damage the cuprous metal facing or the bond between the facing and the backing at that point. By selecting an alloy which will be soft enough and tough enough for rolling and shaping, and thereafter treating the finished article to bring out the age-hardening properties of the facing, the resultant product may be made to provide substantially the strength of a solid article of steel. The specific method of bringing out the age-hardening properties may be varied, but the hardening of such an alloy is done by heating the alloy to approximately the solid solution temperature of the particular alloy and then quenching. The hardening or aging takes place during a subsequent reheating of one to several hours to a temperature lower than the quenching temperature. The quenching temperature is usually between 1300° F., and 1600° F., and the aging temperature between 400° F. and 1150° F. When temperature and time prior to quenching are sufficient to anneal or soften the work-hardened steel backing, the subsequent increase in hardness by aging the copper alloy might not make up for the loss of strength of the product. To avoid this the first heating and quenching is done prior to the operation which produces the finished gauge thickness, cold rolling being resorted to to harden the steel backing which, under these circumstances, work-hardens faster than the copper alloy face. While the copper alloy may be partially hardened by the cold working, it is still sufficiently ductile for forming, as indicated in Figures 15 and 16. Further hardening is then accomplished on the formed article by aging at a temperature lower than the quenching temperature. Thereby the increase of strength is secured in the copper facing comparable to work-hardening by cold rolling of the material.

The absorption of iron from the steel mould may be controlled as above indicated, and other precautions may be taken to limit the area of contact as illustrated, for example, in Figure 5, where the inside surface of the steel band 90 which forms the side walls of the mold are oxidized or covered with a coating or compound of iron which will not be removed by the flux. The weld at 92 is on the unoxidized edge of the metal band 90 and holds it to the steel block 89. By having such a coating as the oxide indicated in Figure 5, the contact of the copper alloy with the side walls of the mold does not allow the migration of iron therefrom in any appreciable quantity. Since the copper alloy will not bond to the oxide, the band may be cut peripherally along the line 92 to remove the band when desired.

The strip or mould band, such as 23 in Figure 2, may be a refractory metal to which copper or copper alloy will not bond, and which has a higher melting temperature than steel. For example, an alloy steel of 20% chromium 1% copper and the remainder iron may be thus employed.

I do not intend to be limited to the details and specific procedure and specific proportions herein disclosed, as variations will at once occur to those skilled in the art, all of which, if coming within the spirit and scope of the appended claims, I intend to include as permissible variations of my invention.

In the present specification and in the appended claims I employ the term "cuprous metal" as a generic term to designate pure copper, commercial copper with incidental impurities, and all copper alloys, that is, alloys of which the melting point is appreciably lower than that of steel, and wherein the properties of copper are recognizable and are usefully employed.

I claim:

1. A composite metal body comprising a backing of low carbon steel and a relatively thin facing of a corrosion resisting copper alloy having age hardening properties, bonded to the steel by fusion, said thin copper alloy facing having work hardening properties similar to those of said steel backing.

2. The composite body of claim 1 wherein the facing comprises an alloy of copper with silicon combined with a metal of the class of iron, nickel, chromium or cobalt, to form a silicide imparting age hardening properties to the alloy.

3. A composite body of metal comprising a backing of steel of 80% to 90% thickness and a corrosion resisting alloy of copper of a thickness of 10% to 20% bonded to the steel by fusion, said alloy comprising silicon .5% to 3%, nickel .5% to 5%, manganese .2% to 1%, and iron absorbed from the steel not to exceed 5%, said corrosion resisting alloy having work hardening properties similar to those of said steel backing.

4. A composite metal body comprising a steel backing and a relatively thin facing of copper containing an element or elements which are more soluble in copper at high temperatures than at low temperatures, said copper facing having work hardening properties similar to those of said steel backing.

THOMAS B. CHACE.